Patented Jan. 12, 1937

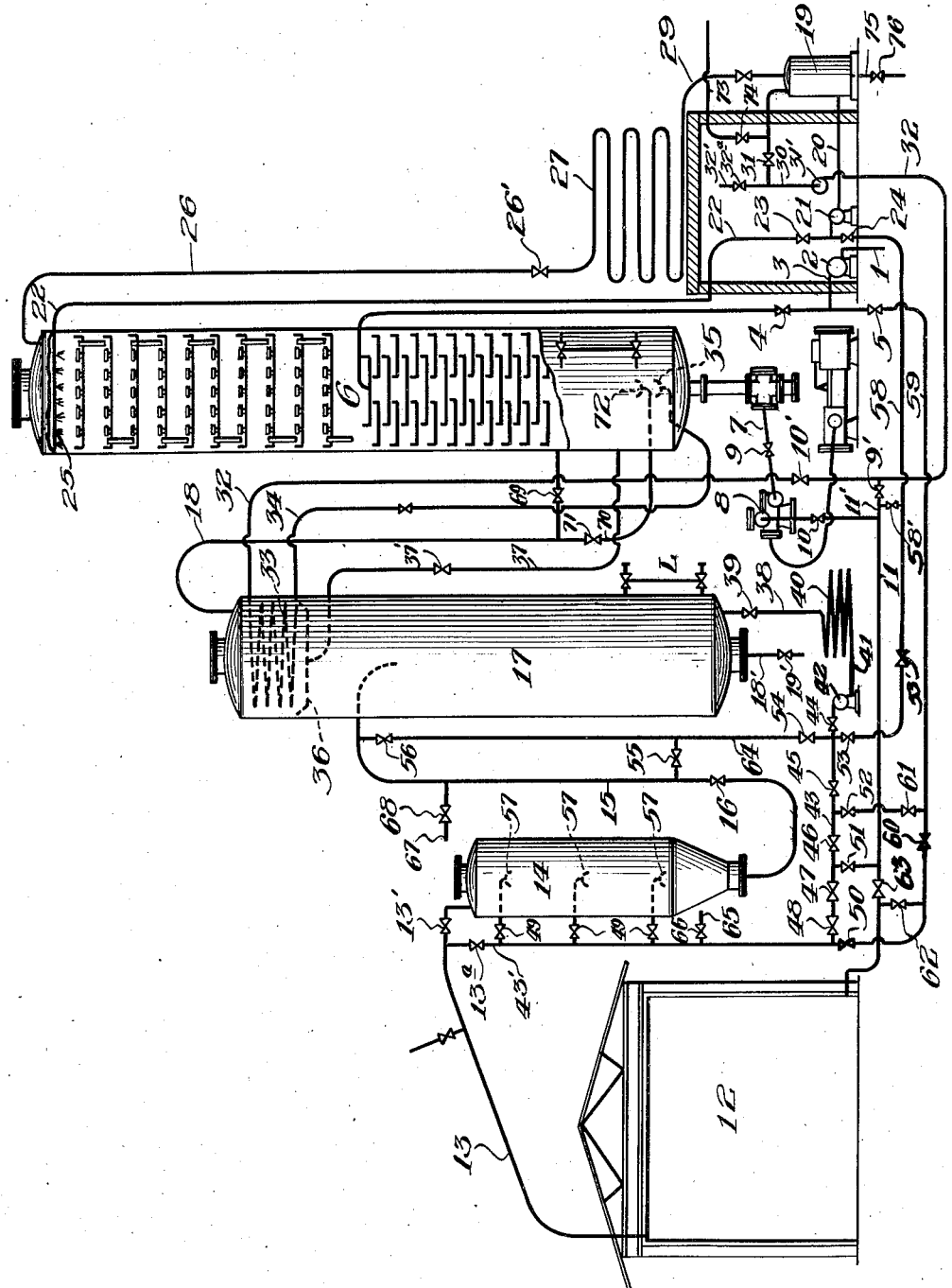

2,067,832

UNITED STATES PATENT OFFICE 2,067,832

APPARATUS FOR CONVERTING HIGHER BOILING HYDROCARBONS INTO LOWER HYDROCARBONS

Carbon P. Dubbs, Chicago, Ill., assignor, by mesne assignments, to Universal Oil Products Company, Chicago, Ill., a corporation of Delaware Application September 12, 1929, Serial No. 392,007
Renewed October 8, 1935

2 Claims. (Cl. 196—107)

In converting higher to lower boiling oils having anti-knock properties, I find it is of great advantage for said oil to be brought to its maximum allowable temperature in the shortest possible time, this maximum allowable temperature ranging from approximately 800 to 1100 degrees F. I give a range of temperature rather than a specific temperature, because in the operation of my apparatus the temperatures used will be governed by the oil being treated and the products desired and qualities sought; in fact, the "maximum allowable temperature" should be just below that temperature at which it is physically impossible to dissipate the heat before the speed of the reaction converts an undesirable amount of the oil into fixed gas and coke. While the oil is in the heating and reaction elements, the oil should be held under sufficient pressure so that vaporization will not proceed to that degree where coke is formed.

I find that the higher temperatures increase the anti-knock properties of the desired low boiling point products. Such liquid residue as one chooses to make is practically free from coke and sludge. Furthermore, by the control of the operation, the residue can be made to have any desired viscosity, within wide limits. On the other hand, operations, wherein all of the volatile part of the oil is vaporized, result in a more complete breaking up of the oil which produce a higher carbon coke and, therefore, lesser volume of coke residue. The results are dependent upon bringing the oil quickly to the desired temperature, maintaining the oils at that temperature not longer than the time necessary to effect the desired reaction, then quickly reducing such temperature to such degree as to produce the desired result, separating the residual liquid or coke from the vapors, reducing the temperature of such vapors, to separate the higher boiling point vapors from the lower boiling point vapors, by condensing the former and again subjecting them to another like treatment, along with a fresh supply of raw oil. The lower boiling point vapors are condensed and are withdrawn in whole or in part, from the process. The higher the temperature to which the oil is heated, the shorter the time such oil must be subjected to such temperature. This rule holds true until temperatures are reached at which the speed of the reaction is so great as to produce an undesirable volume of fixed gas or coke before the reaction can be arrested by cooling.

In the use of these high temperatures, it is very essential that the oil be reduced in temperature in the quickest way so as to positively control the quality of the products desired. The apparatus I have shown in the accompanying drawing is suitably adapted to accomplish these results.

The volumetric ratio of liquid to vapors is controlled by correlating the condition of time and pressure maintained on the heating and reaction elements with the temperature to which the particular oil is heated. It is desirable that the pressure should be such as to insure a substantial proportion of the oil in the heating and reaction elements remaining in the liquid state, thus preventing vaporization to dryness and the consequent deposition of coke in the heating or reaction elements.

To illustrate, Mid-Continent 24 Baumé gravity fuel oil when distilled to dryness at atmospheric pressure, produces approximately 10% coke, while on the other hand, if from the same oil only 75% be distilled off, the liquid residue remaining is free from objectionable amounts of coke or sludge. A gas oil treated in the same manner when distilled to dryness, leaves a residue containing about 2% coke, but when only about 90% of same is distilled off, the liquid residue left is free from objectionable amounts of coke or sludge.

In heating oils passing continuously through a pipe coil and reaction chamber the above holds true; that is, if oil passing through the heating coil and reaction chamber be wholly vaporized therein, coke will be deposited approximately at that point where complete vaporization takes place. Therefore, to avoid a deposition of coke in the heating coil and reaction chamber, it is essential to employ such pressure (relative to temperature) as is necessary to hold a certain portion of the oil in the liquid state, including the higher boiling portion produced from the cracking.

When heating oil to cracking temperature and maintaining same under a pressure there is no absolute rule that will enable one to predetermine the exact pressure and temperatures to be used, because at a given cracking temperature the proportion of oil vaporized will vary according to the time the particular oil is held at such temperature. If in a preliminary run coke be found in the heating coil or reaction chamber, then the pressure is too low for the temperature employed, in which case the pressure must be increased until a pressure is reached that will prevent the deposition of coke in the tubes or reaction chamber. This always holds true, but if the temperatures chosen be so high that the corresponding reaction rate reaches a value where it cannot be arrested quickly enough by partial cooling, then an undesirable portion of the oil undergoing treatment will be converted into fixed gas or coke.

By the use of high temperatures the capacity of the cracking plants is enormously increased, the anti-knock properties of the desired low boiling products are greatly increased, and when producing a liquid residue, it will be substantially free from sludge and coke, and will have the desired viscosity.

In order to control these conditions the whole of the oil might be abruptly cooled and condensed, but this would be an uneconomical operation. It would necessitate the reheating of the treated oil, distilling off the gasoline and the intermediate fractions, the latter for recracking, and leaving either coke or a liquid residue of the desired qualities. In this apparatus the heating, the control of cracking, the separation of the vapors from the residue, the separation of the lower boiling vapors from the higher boiling vapors, and the recracking of the latter, are all carried on simultaneously with a great saving of labor, fuel, and equipment.

It is of great importance that the degree of cooling of the heated mass of oil be controlled. When making a liquid residue this is done in such a way as to produce as liquid only the desired quality and quantity of residue. This residue is separated from the uncondensed portions and the latter separated by condensing the heavier ends which with additional raw oil are subjected to repeated like heat treatments, meanwhile taking off the desired low boiling products, condensing and withdrawing them from the apparatus.

It is readily seen that by this apparatus the oil can be heated to a much higher temperature than heretofore possible with very beneficial results at the same time avoiding the very serious difficulties and objectionable reactions usually resulting from such high temperatures.

Attached is a schematic drawing of a side elevation of the apparatus.

Line marked 1 leads from any suitable supply of oil to be treated. By means of pump 2 the oil is forced through line 3, valve 4 being open and valve 5 being closed. The oil is preferably discharged into dephlegmator 6 as shown; part or all of the oil may be fed direct. Dephlegmator 6 may be a combination of bubble trays and perforated pans. The raw oil is fed onto the top of the perforated pans. These are used in the lower section because when treating a heavy oil, such as crude fuel oil, topped crude, etc., in ordinary practice, it has been found, if this oil be fed onto bubble trays, it tends to more or less clog them; therefore, perforated pans may be used below the raw oil feed point. When using gas oils or similar oils all trays may be of the bubble plate type.

The oil may be preheated or put in at normal atmospheric temperatures. If the charging stock contains a substantial amount of the desired low boiling products or water, it is of advantage to preheat it. As the oil descends through the perforated pans counter-current to the hot ascending vapors, the latter are partially cooled causing the higher boiling point portions to condense and work down to the bottom of the dephlegmator along with the raw oil fed in. By this action, the raw oil is substantially increased in temperature, and any water or desired low boiling portions are vaporized and pass out of the top of the dephlegmator with the low boiling cracked vapors. The temperature of the oil accumulating in the bottom of the dephlegmator 6 is approximately 500–600 degrees F. The oil from the bottom of dephlegmator 6 passes through line 7, through hot oil pump 8, valves 9 and 10 being open, discharging through line 11 into heating coils in furnace 12. That part of the coils functioning as a preheater for the oil may be manifolded, and the rest of the coil should be continuous, except in those plants where the capacity is so great as to permit manifolding the coils without reducing the velocity of the oil to such an extent as to unduly prolong the time it is under cracking temperatures. Openings should be provided in the coils for cleaning. In order to reduce the time factor, particularly in the heating element, without substantially changing the capacity, a fluid of the desired temperature may be injected in regulated quantities, e. g., incondensible gas may be passed through line 11' controlled by valve 9' into line 11, or distillate may be passed from line 58 through line 11' controlled by valve 58' into line 11. Valves 53' and 10' are control valves. Under certain conditions I may introduce the fluid at a point between the inlet and discharge of the heating coil to thus shorten the time element from such point to the exit of the heating coil. I have not shown this connection in the drawing, as those versed in the art will fully understand how to make such connection.

As the oil passes through the coil it reaches a temperature of approximately 850 to 1100 degrees F., and discharges through transfer line 13 and valve 13' into the top of reaction chamber 14. A suitable cooler fluid may be injected in controlled amount into line 13 through line 43' controlled by valve 13a. The nature, temperature and source of this fluid is hereinafter described. All of this oil passes out through line 15. The pressure on the coils in furnace 12 and reaction chamber 14 is controlled by valve 16, which controls the discharge of the oil into separating chamber 17. Here the vaporized portion, governed by the degree of reduced pressure and substance used for cooling the heated mass, is separated from the unvaporized portion, the latter being withdrawn through line 18', controlled by valve 19', passed through cooling coil (not shown) and sent to storage.

The portion of the oil vaporized passes out of the top of separating chamber 17, through line 18, into the lower section of dephlegmator 6, valve 69 being opened and valve 71 being closed. (or the vapors may be sent into spray 72, located below the liquid level, by closing valve 69 and opening valve 71 having the vapors go through line 70, or part may be injected into dephlegmator 6 through spray 72 into the liquid and the remainder injected above the liquid by the proper manipulation of valves 69 and 71) they are first partially cooled by the incoming raw oil causing the higher boiling point products to condense and drop to the bottom of dephlegmator 6. The remaining vapors pass up through the bubble plates and such portion, not of the desired low boiling point, is cooled, condensed and passes back through the different pools of oil in the bubble plates. From there it works down through the perforated plates and combines with the liquid in the bottom of the dephlegmator 6. This latter cooling is controlled by taking the necessary quantity of condensate from distillate receiver 19, through line 20, through pump 21, and discharging it into line 22, valve 23 being opened and valve 24 being closed. This quantity of distillate is sprayed onto the top bubble plate through spray 25.

The remaining vapors from the top of dephlegmator 6 being of the desired range of low boiling points, along with the uncondensable gas, pass through line 26 and valve 26' through condensing coil 27, through line 29, into receiver 19. The condensate is discharged through line 75, valve 76 controlling, to rundown tank (not shown). The condensate accumulating in the bottom of dephlegmator 6 will contain more or less oil within the boiling range of the vapors going out of the top of dephlegmator 6, unless these are recovered by what is termed "reboiling".

In the attached drawing I have shown one way to accomplish this, by taking some of the uncondensable gas from receiver 19, through line 30, valve 31 being open, and by means of pump 31' discharging it through line 32 into coil 33, located in the upper section of separating chamber 17. As this gas passes therethrough it is heated, then passes through line 34 into spray 35 located in the bottom of dephlegmator 6, thus acting as a reboiler.

It will be understood that other gases preheated in other ways may be used, as well as steam, which may be introduced through line 32', controlled by valve 32a. It should also be understood that instead of heating the gases through coil 33 the raw oil being fed to the plant may be heated in this matter. I have not shown the connections, because one versed in the art will readily understand how to make these. In heating these gases or raw oil in coil 33 more or less of the higher boiling point vapors in separating chamber 17 will be condensed. These are collected on pan 36 and automatically drain through line 37, controlled by valve 37', into the bottom section of dephlegmator 6.

If one wishes to make a liquid residue suitable for making asphalt, then the partial cooling of the oil should be done while the whole of the oil is under pressure, because pressure prevents vaporization of certain parts of the oil. It is desirable to reduce the temperature of this oil below the temperature at which these portions will vaporize when the pressure is reduced. The degree of cooling will be governed, of course, by the quantity and quality of residuum desired.

Several methods of cooling are provided in this apparatus, the first being, to take out of the bottom of the separating chamber 17 the necessary volume of oil through line 38, valve 39 being open, and to pass it through cooler 40, which allows the cooling oil to be delivered at any temperature desired. The degree of cooling is important in some cases to avoid too great a shock cooling to the heated oil. From cooler 40 the oil goes through line 41, through pump 42, through line 43, valves 44, 45, 46, 47, 48 and 49 being open, valves 50, 51, 52, 53, 54, 55 and 56 being closed. In this manner the cooled oil is, injected into spray 57, shown in the bottom section of reaction chamber 14. If a shorter reaction time be desired, then spray 57 may be located at such higher elevations in reaction chamber 17 as will bring this about.

Before the vaporized and unvaporized oils pass from reaction chamber 14 they are cooled under pressure to the desired degree. As they pass through control valve 16 on line 15, the pressure is reduced to the desired degree which reduction in pressure, to some extent, governs the amount taken off as vapors and the amount taken off as liquid in separating chamber 17. It will be understood that instead of taking off a part of the liquid from separating chamber 17, cooling it and injecting it into reaction chamber 14 in the manner previously described, one can take the same oil from the storage tank 10 in which the residuum from the separating chamber is stored, and inject this directly into cooling spray 57. Another method of bringing about this cooling is to inject condensate from tank 19. That portion needed for cooling is taken through line 20, through pump 21, through valve 24, through line 58, through valve 53, into line 43. In this case the valves already described stay in the same positions with the exception that valves 39 and 44 are closed, valve 23 regulating the quantity going to dephlegmator 6. In using the condensate from receiver 19 for cooling the exit oil from the reaction chamber 14, such cooling material is vaporized by absorbing heat and this increases the volume of vapors in chamber 14, thus speeding up the discharge of the oil and reducing the time of passage of the oil through the reaction chamber. In some operations this is of great importance for obtaining gasoline with high anti-knock properties and producing a fuel oil of low viscosity free from sludge.

Another method of cooling is to divert a part or all of the raw oil through line 59, valve 5 controlling the columns, valves 60, 50 and 49 being open, valves 61, 62, 48, 47, 46, 52, 45, 54, 44, 53 and 39 being closed.

When running this apparatus on fuel oil or topped crude and using a part of it for cooling the oil in the reaction chamber 14, it must be borne in mind that part of such raw oil used for cooling which is not vaporized at the temperature of this mixture will not be substantially broken down in viscosity.

This is of great value where this residue is desired to produce asphalt. Where the residue is to be used for fuel, it then becomes somewhat of a detriment. Cooling of the oil in reaction chamber 14 may be accomplished by using a part of the condensate from the bottom of dephlegmator 6. To do this valves 63 and 51 control the amount going to the coil in furnace 12, and the amount going into spray 57 in reaction chamber 14, valves 47, 48 and 49 being open, and valves 50, 46, 52, 45, 54, 53, 44 and 39 being closed.

When it is desirable to produce a fuel oil of the lowest possible viscosity and yet free of sludge, it is of advantage to inject the cooling oil into the oil from the reaction chamber after the pressure has been released from this oil, because on released pressure part of the unvaporized oil instantly vaporizes and then is instantly condensed by the injected cooling oil. This tends to further break down the viscosity. However, if the temperature of the oil is such as will cause it to completely vaporize on release of pressure, the cooling must be brought about immediately and at the point where the pressure is released, else coke will be formed. When the oil is at such a high temperature that coke is deposited under these conditions, then the cooling should be done before the pressure on the oil is released and in the manner already described. The cooling of the oil, with any of the material previously mentioned, after the pressure is released is accomplished by injecting the cooling medium through line 64, valve 54 controlling, into line 15, either through valve 55 or 56, and after the pressure has been released by control valve 16. One versed in the art will understand from the drawing what other valves are to be closed in order to do this. He will also readily understand that any combination of these cooling materials may be used. Furthermore, steam may be used for cooling the oil either before or after the pressure is released. In using steam before the pressure is released, it is injected through line 65, valve 66 controlling. Steam is injected into the oil after the pressure is released through line 67, valve 68 controlling.

Under certain conditions all of the oil passing from chamber 14 through control valve 16 will be vaporized in chamber 17 except the coke which will deposit on the bottom of the separating chamber 17. This is known as a non-residuum operation and is brought about by the kind and degree of partial cooling of the whole of the oil leaving reaction chamber 14. As soon as the open portion of the lower section of separating chamber 17 becomes filled with coke, the apparatus is shut down and such coke cleaned out. To avoid shutting down, a second separating chamber 17 may be provided so that the oil may be diverted into it while the first chamber is being cleaned. Since this is well understood by those versed in the art, I have not shown the arrangement on the drawing.

Suitable pyrometers and pressure gauges are provided while at L are liquid level gauges.

The vapors from the separating chamber may be injected into the liquid in the lower part of dephlegmator 6, causing it to act as a reboiler. This is done by closing valve 69 and passing the vapors through line 70 by opening valve 71 and discharging these vapors through spray 72.

Provided one does not wish to provide a pump, the pressure held on receiver 19 is such as to force the oil from the receiver to the storage tank (not shown). This pressure is controlled by regulating the discharge of uncondensable gas from the receiver through line 73, controlled by valve 74.

Illustrating the operation of the apparatus, I give an example of one type of operation using a 27 gravity topped crude from the Mid-Continent field. As the oil flows through the heating elements located in the furnace 12 it is quickly brought to a temperature of approximately 975 degree F., and passes into the reaction chamber 14, the whole of it being maintained at a pressure of approximately 375 pounds per square inch and is subjected to this temperature for approximately one-sixth of one minute. The whole of the oil continuously passes through line 15 into separating chamber 17, this chamber being held at approximately 30 pounds pressure, reduction of pressure from chamber 14 to chamber 17 being controlled by valve 16. In chamber 17, all of the volatile portion of the oil is vaporized and passes out through lines 18 and 70 through spray 72 into the bottom of the dephlegmator 6. Such amount of vapors condensed in 17 pass through line 37 and valve 37' into the bottom of dephlegmator 6. The coke accumulates in chamber 17. As the vapors pass up through the dephlegmator 6, they are cooled, by either raw oil and/or other means already described. The final vapors exiting from the top of dephlegmator 6 are at approximately 300 to 325 degrees F., and pass through condensing coil 27 through line 29 and are collected in receiver 19 and are continuously withdrawn therefrom through line 75 to storage (not shown), while the gases are taken off through line 73, controlled by valve 74. The vapors condensed in dephlegmator 6 along with the unvaporized portion of the cooling oil drop to the bottom and are at approximately 500 to 600 degrees F., and are continuously withdrawn through line 7 by means of hot oil pump 8 through line 11 into heating oils in furnace 12.

If, instead of producing coke, it is desired to produce a liquid residue, then the heated oil in chamber 14 is reduced in temperature by the injection through spray 57 of the desired kind and quantity of cooling oil so as to bring the heated mass down in temperature so that when it is discharged into chamber 17 at a reduced pressure, it will leave a liquid residue of the desired quality and quantity in chamber 17, which is continuously withdrawn through line 18', controlled by valve 19' and passed through a cooling oil and to storage tanks (not shown).

I claim as my invention:

1. An oil cracking apparatus comprising oil heating means and a reaction chamber in communication therewith, a vapor separating chamber, a transfer line for passing oil constituents from said reaction chamber to said separating chamber, means for condensing the vapors separated in said separating chamber, means for passing unvaporized oil from the separating chamber into the reaction chamber, and a direct communication between the condensing means and the transfer line for introducing to said transfer line a portion of the condensate formed in said condensing means.

2. An oil cracking apparatus comprising oil heating means and a reaction chamber in communication therewith, a vapor separating chamber, a transfer line for passing oil constituents from said reaction chamber to said separating chamber, means for passing unvaporized oil from the separating chamber into the reaction chamber, a dephlegmator and a final condenser serially connected to said separating chamber, and a direct communication between the final condenser and the transfer line for introducing to said transfer line a portion of the condensate formed in said final condenser.

CARBON P. DUBBS.